United States Patent
Thrift et al.

(10) Patent No.: US 6,690,984 B1
(45) Date of Patent: Feb. 10, 2004

(54) SYSTEM AND METHOD FOR ASSEMBLY INTEGRATION

(75) Inventors: John R. Thrift, Sioux City, IA (US); James L. Kroening, Dakota Dunes, SD (US); Darrin J. Fangman, McCook, SD (US); James Marshall, Jefferson, SD (US); Jose L. Leon, Jr., Sioux City, IA (US); Allan Klink, Sioux City, IA (US); Frank W. O'Neal, IV, McCook Lake, SD (US)

(73) Assignee: Gateway, Inc., Poway, CA (US)

( * ) Notice: Subject to any disclaimer, the term of this patent is extended or adjusted under 35 U.S.C. 154(b) by 499 days.

(21) Appl. No.: 09/631,641

(22) Filed: Aug. 2, 2000

Related U.S. Application Data (63) Continuation-in-part of application No. 09/562,870, filed on May 1, 2000, now abandoned, which is a continuation of application No. 09/090,118, filed on Jun. 4, 1998, now Pat. No. 6,080,207, and a continuation of application No. PCT/US99/08095, filed on Apr. 13, 1999.

(51) Int. Cl.[7] .............................................. G06F 19/00
(52) U.S. Cl. .................... 700/106; 700/95; 700/103; 700/117; 705/26; 705/29
(58) Field of Search .............................. 700/95–97, 103, 700/106, 117, 233; 705/26, 29

(56) References Cited

U.S. PATENT DOCUMENTS

| | | | |
|---|---|---|---|
| 5,894,571 A | 4/1999 | O'Connor | 395/652 |
| 5,963,743 A | 10/1999 | Amberg et al. | 395/712 |
| 5,991,543 A | 11/1999 | Amberg et al. | 395/712 |
| 5,995,757 A | 11/1999 | Amberg et al. | 395/712 |
| 6,292,707 B1 * | 9/2001 | Hair et al. | 700/97 |

* cited by examiner

Primary Examiner—Jayprakash N. Gandhi
(74) Attorney, Agent, or Firm—Scott Charles Richardson; Chad W. Swantz; Suiter - West

(57) ABSTRACT

The present invention is directed to a system and method for assembly integration. A method of assembling a product based on a received order includes receiving an order for a product having a desired configuration. A parts list is generated corresponding to the desired configuration and an assembly method is applied to the parts list to derive an assembly script. The assembly script is transferred to a plurality of assembly station wherein the assembly script provides a custom instruction to the assembly stations. Thus, the product corresponding to the order may be produced having the desired configuration.

18 Claims, 11 Drawing Sheets

SYSTEM AND METHOD FOR ASSEMBLY INTEGRATION

CROSS REFERENCE TO RELATED APPLICATION

The present application is a Continuation-In-Part of U.S. patent application Ser. No. 09/562,870 filed May 1, 2000 (now abandoned), which is a Continuation of U.S. patent application Ser. No. 09/090,118 filed Jun. 4, 1998, now U.S. Pat. No. 6,080,207 issued Jun. 27, 2000.

The present application is also a Continuation-In-Part of International Patent Application Serial Number PCT/US99/08095, international filing date Apr. 13, 1999, pending. Said U.S. patent application Ser. No. 09/090,118, Patent Cooperation Treaty Application PCT/US99/08095 and U.S. patent application Ser. No. 09/562,870 are herein incorporated by reference in their entirety. The following patent applications are also incorporated by reference in their entirety:

| Attorney Docket No. | Filing Date | Serial Number |
| --- | --- | --- |
| GW 97-0506B | August 2, 2000 | EL 643 197 522 US |
| GW 97-0506D1 | August 2, 2000 | EL 643 197 289 US |
| GW 97-0506D2 | August 2, 2000 | EL 643 197 301 US |
| GW 97-0506D4 | August 2, 2000 | EL 643 197 292 US |

FIELD OF THE INVENTION

The present invention generally relates to the field of assembly and manufacture, and particularly to a system and method for assembly integration.

BACKGROUND OF THE INVENTION

The production and assembly of products has become increasing more competitive. For example, manufacturers of information handling systems, such as typical computer systems, convergence systems, digital information appliances, Internet appliances, personal digital assistants, and the like, must offer a variety of consumer choices to compete in a modern market. However, the provision of these multiple choices increases the complexity and therefore the cost of the manufacturing process. For instance, a manufacturer not only has to supply a production process for each option, but also the parts, requiring inventory, differences in packaging, shipping, and the like. The management of these diverse tasks may result in great inefficiencies as the overhead is increased with the addition of each option.

Previous methods utilized to address this problem resulted in great bureaucracies and costs. Consumers, selecting from a variety of product options, may arrive at a diverse variety of products. To produce these products, the manufacturer must determine the parts required, if they are available, stock the parts, and derive a production process for actually assembling and producing the product. Each of these tasks required transferring corresponding work orders to various production groups, at which time the work order was received, option located, and then installed. However, the time requirements of operating such a system may be unsuitable in modern operations, wherein inventory is kept as low as possible yet still lower production time to the fastest turn-around possible.

Therefore, it would be desirable to provide an integrated assembly system and method.

SUMMARY OF THE INVENTION

Accordingly, the present invention is directed to a system and method for assembly integration. In a first aspect of the present invention, a method of assembling a product based on a received order includes receiving an order for a product having a desired configuration. A parts list is generated corresponding to the desired configuration and an assembly method is applied to the parts list to derive an assembly script. The assembly script is transferred to a plurality of assembly station wherein the assembly script provides a custom instruction to the assembly stations. Thus, the product corresponding to the order may be produced having the desired configuration.

In a second aspect of the present invention, a system for assembling a product based on a received order includes a receiver for receiving an order coupled to a network, the receiver suitable for receiving an order for a product having a desired configuration. A parts lists generator is coupled to the receiver, the parts list generator suitable for generating a parts list corresponding to the desired configuration. An assembly integration process is coupled to the parts list generator, the assembly integration process suitable for applying an assembly method to the parts list to derive an assembly script. A plurality of assembly stations are coupled to the assembly integration process, the plurality of assembly stations suitable for producing a product utilizing the assembly script. The assembly script provides a custom instruction to the assembly stations so that the product corresponding to the order may be produced having the desired configuration.

In a third aspect of the present invention, a system for assembling a product based on a received order includes a processor for executing a program of instruction on the system. A memory is coupled to the processor, the memory suitable for storing the program of instructions executable by said processor; wherein the program of instructions configures the system to receive an order for a product having a desired configuration. A parts list is generated corresponding to the desired configuration. An assembly method is applied to the parts list to derive an assembly script. The assembly script is transferred to a plurality of assembly stations, wherein the assembly script provides a custom instruction to the assembly stations so that the product corresponding to the order may be produced having the desired configuration.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

In the following detailed description of the preferred embodiments, reference is made to the accompanying drawings, which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the scope of the present inventions. The following detailed description is, therefore, not to be taken in a limiting sense. Reference will now be made in detail to the presently preferred embodiments of the invention, examples of which are illustrated in the accompanying drawings.

Referring generally now to FIGS. 1 through 8, exemplary embodiments of the present invention are shown. The present invention may aid in the efficient production of a variety of different products, and it should be realized that although the production of an information handling system is disclosed, the present invention contemplates other products without departing from the spirit and scope thereof.

Figure 1:
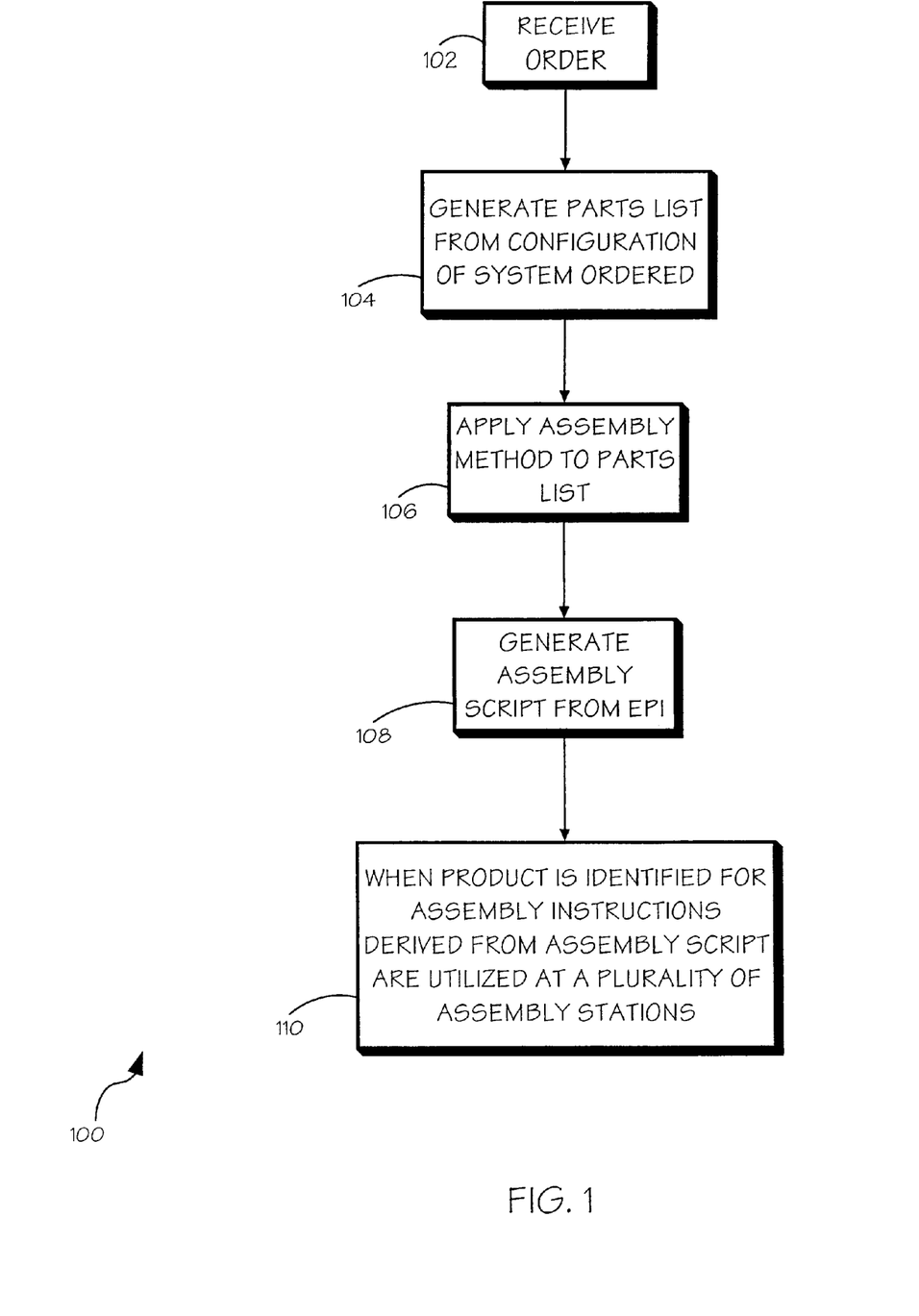
FIG. 1 is a flow diagram depicting an exemplary embodiment of the present invention wherein a parts list and an assembly script are derived from the configuration of an ordered product.

Referring now to FIG. 1, an exemplary embodiment 100 of the present invention is shown. An order is received is the system 102. A parts list is then generated based on the configuration of the system ordered 104. An assembly method is applied to the parts list 106 and an assembly script is then generated 108. Thus, when a product is identified for assembly, instructions derived from the assembly script are utilized at a plurality of assembly stations to produce the product in the configuration specified 110. In this way, the present invention is able to produce a variety of configurations as desired by a consumer in an efficient manner.

Figure 2:
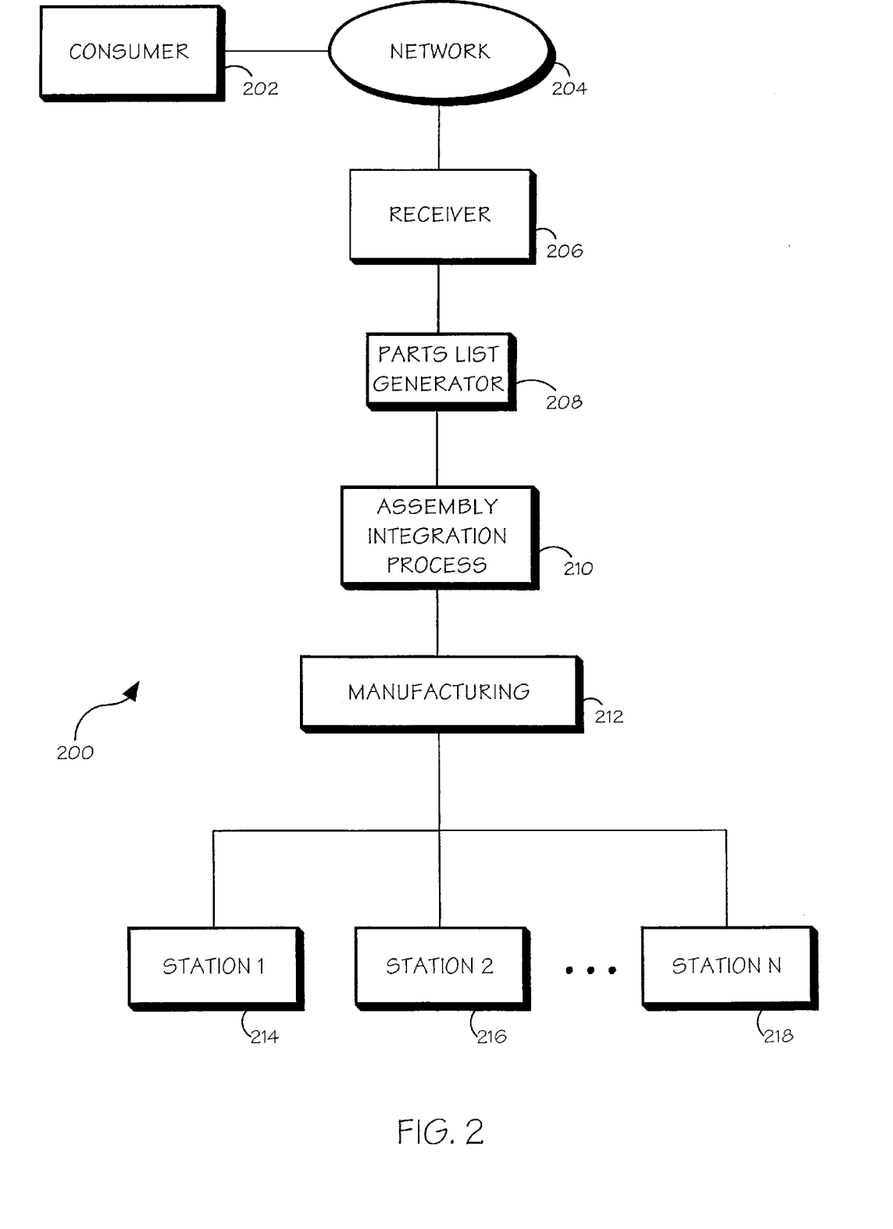
FIG. 2 is a block diagram depicting an exemplary embodiment of the present invention wherein a consumer accesses a system of the present invention over a network.

Referring now to FIG. 2, an exemplary embodiment 200 of the present invention is shown wherein block-diagram depicts a system of the present invention. A consumer 202 may interact over a network 204 with a receiver 206 suitable for receiving an order for a product having a desired configuration. A parts list generator 208 is coupled to the receiver for generating a parts list corresponding to the desired configuration. An assembly integration process 210 is coupled to the parts list generator 208, the assembly integration process suitable for applying an assembly method to the parts list to derive an assembly script. A manufacturing process 212 including a plurality of assembly stations 214, 216 and 218 are coupled to the assembly integration process. The assembly script provides a custom instruction to the assembly stations 214, 216 and 218 so that the product corresponding to the order may be produced having the desired configuration.

Figure 3:
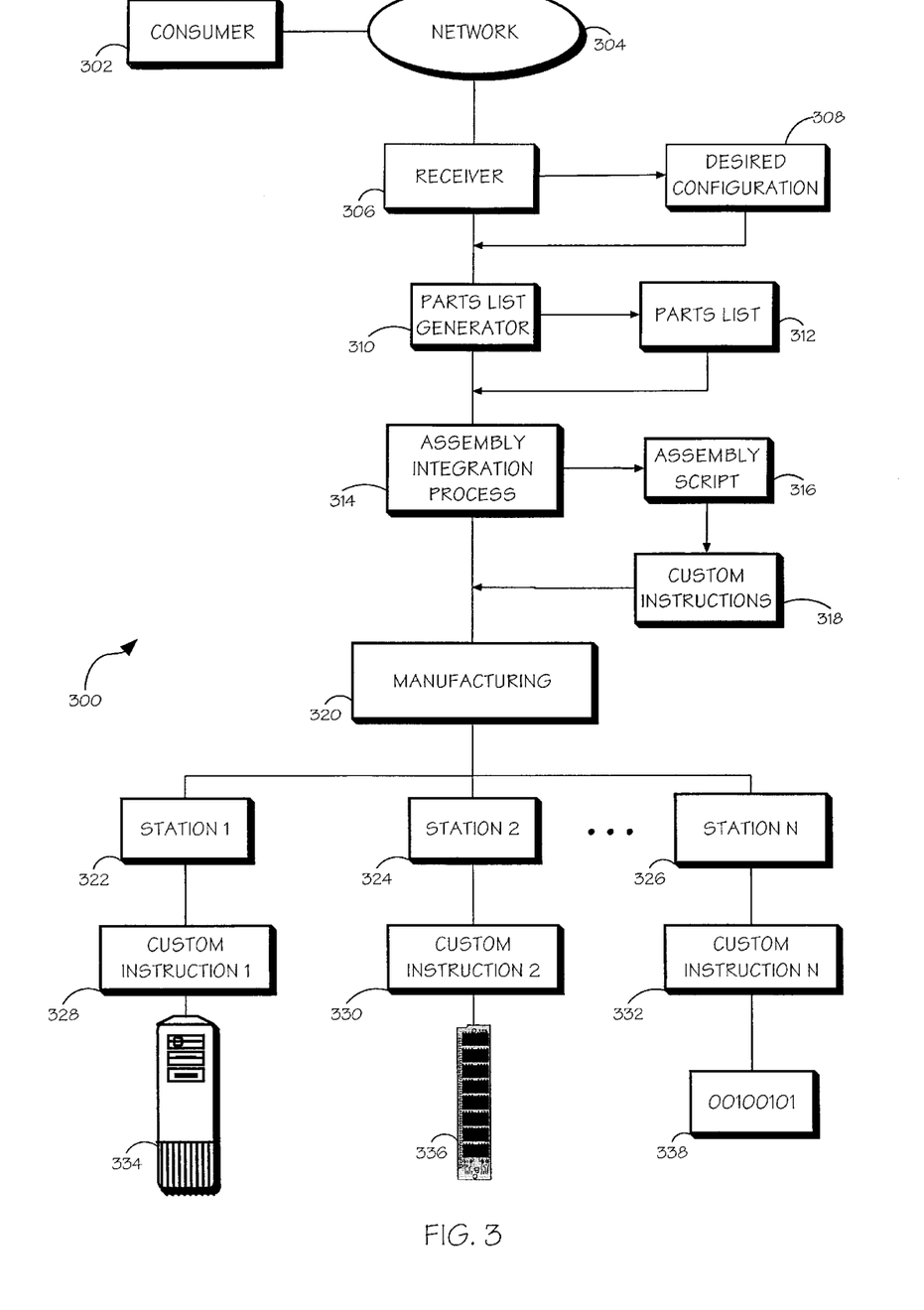
FIG. 3 is a block diagram illustrating an exemplary embodiment wherein a consumer accesses a system capable of receiving a customized product order and a parts lists and assembly script are derived based on the customized order and output to a plurality of assembly stations.

Referring now to FIG. 3, an exemplary embodiment of the present invention is shown. A consumer 302 accessing a network 304, such as the Internet and World Wide Web, accesses a receiver 306, such as a Web site. The consumer 302 interacts with the receiver 306 to choose a desired product. The receiver 306 acquires the desired configuration 308 and transfers that information to a parts list generator 310. The parts list generator 310 analyzes the desired configuration 306 to arrive at a parts list 312 for the desired configuration 308. The parts list 312 is then transferred to an assembly integration process 314. The assembly integration process 314 takes the parts list 312 and derives an assembly script 316 including custom instruction 318 so as to orchestrate the production of the desired configuration 308. The assembly script 316 is then sent to manufacturing 320. Thus, each assembly station 322, 324 and 326 may receive customized instructions 328, 330 and 332 for manufacturing the desired product. For example, Station One 322 may included a customized instruction 328 specifying the type of housing 334 to be used for the desired information handling system. Station Two 324 may include a custom instruction two 330 including the amount of memory 336 to be included on the information handling system. Additionally, Station N 326 may include a custom instruction N 332 including the software 338 to be installed on the information handling system. In this way, the information handling system may be produced in the desired configuration with a minimum amount of user interaction.

In one embodiment, the system is a minicomputer. A minicomputer includes a multi-processing system capable of supporting from four to about two hundred users simultaneously. Minicomputers are well known to those skilled in the art. For example, an IBM AS/400 minicomputer may function as the receiver 306 (FIG. 3) in one embodiment. In terms of size and power, a minicomputer falls between a workstation and a mainframe. Equivalent inputting methods are contemplated as alternatives to using a minicomputer, such as the use of a workstation, mainframe, or other information handling system.

Information included within the parts list corresponds to the particular configuration desired by a consumer, plus specifics on the information handling system itself. For example, the parts list may include the particular software configuration 338 (FIG. 3) desired by a consumer, plus specifics on the information handling system receiving the software configuration. A desired configuration may include an upgrade to an application already installed on the information handling system or the configuration may also include a new component that is to be configured with desired software and the like, such as a new operating system, variety of applications, and the like. Specifics on the information handling system may include, but are not limited to the following parameters, hard drive size, installed accessories, current software configuration, BIOS and CMOS settings.

Figure 4:
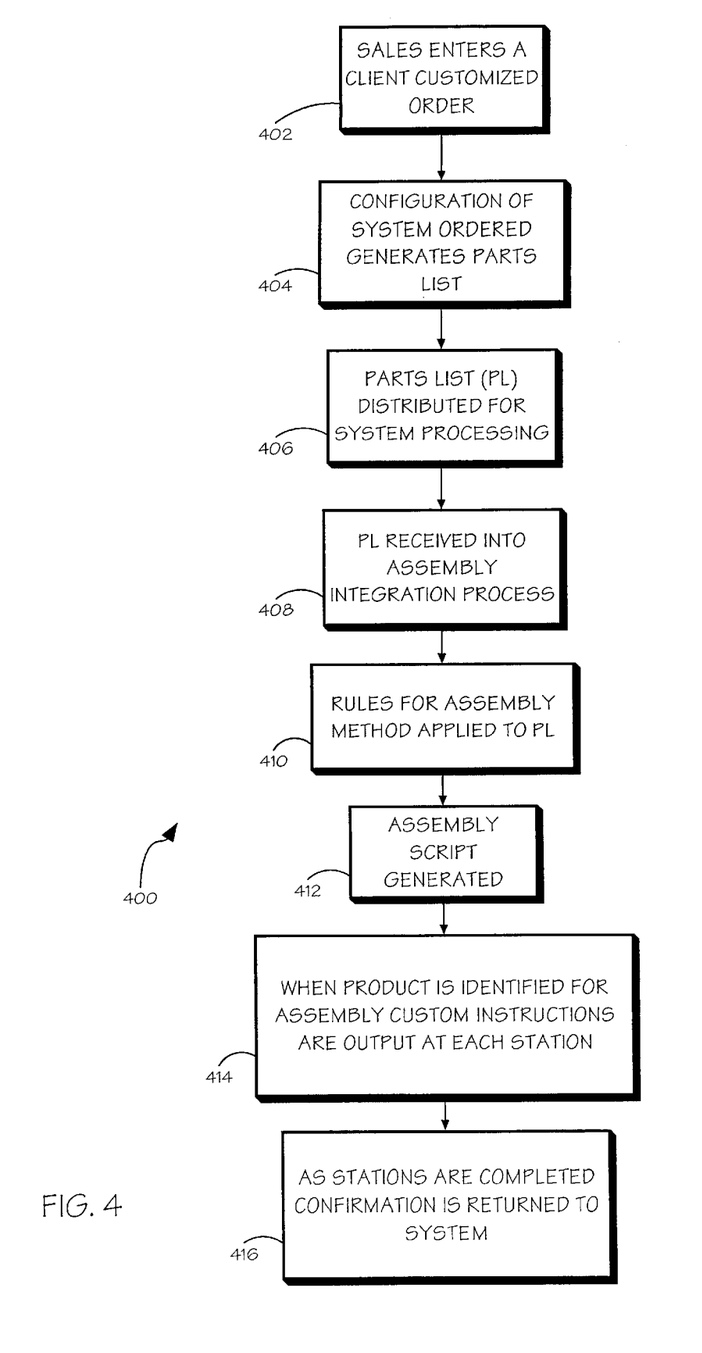
FIG. 4 is a flow diagram depicting an exemplary embodiment wherein the configuration of an ordered system is utilized to generate a parts list and assembly script including confirmation of the completion of the assembly script.

Referring now to FIG. 4, an exemplary method 400 of the present invention is shown wherein an order received by a salesperson is entered into an assembly integration system. A sales associate, such as a person in a call center, receives a sales call and enters the desired configuration into the system 402. The configuration of the system ordered is utilized to generate a parts list 404. The parts list is then distributed for system processing 406 and received into an assembly integration process 408. The assembly integration process applies rules for an assembly method to the parts list 410. Thus, an assembly script is generated for manufacture of the customized order 412. The assembly script may then be utilized to provide custom instructions at each station when the corresponding product is identified 414. In this way, an information handling system corresponding to the order may be produced having the desired configuration. Further, it may be desirable to provide confirmation from the assembly station that the custom instruction has been performed 416.

Figure 5:
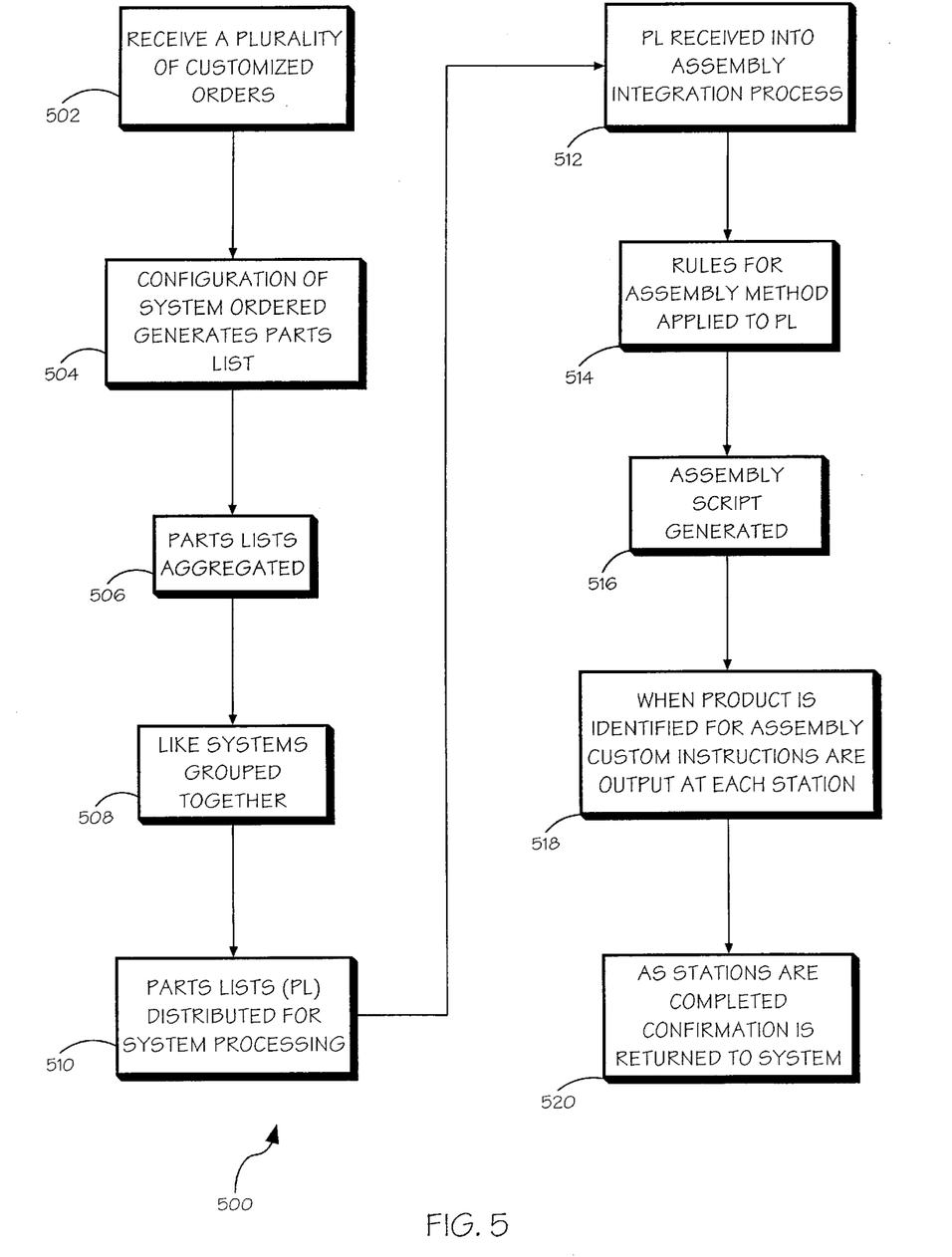
FIG. 5 is a flow diagram illustrating an additional exemplary embodiment of the present invention wherein the configuration of a plurality of order systems is utilized to generate an aggregated parts list.

Referring now to FIG. 5, an additional exemplary embodiment 500 of the present invention is shown wherein an assembly integration system includes grouping of like orders together based on similar parts. Grouping like orders together may allow for increased efficiency due to the commonality between orders. For example, a system may receive a plurality of customized orders involving a variety of consumer options 502. The configuration of the system ordered generates a parts list 504. The plurality of parts lists are aggregated 506 and like systems are grouped together 508. The parts lists are distributed for system processing 510. Once the parts list is received into an assembly integration process 512, rules for an assembly method are applied to the parts list 514. An assembly script is generated from the parts lists 516. Thus, when a product is identified for assembly, custom instructions are output at each station to the grouped orders 518. Further, by grouping like system together, the performance of the assembly script may be optimized. For example, the grouping may be performed for like parts, like assembly processes, quantities of like parts, and the like. It may also be preferable to receive a confirmation from the assembly station 520 so that performance of the assembly script may be monitored.

Figure 6:
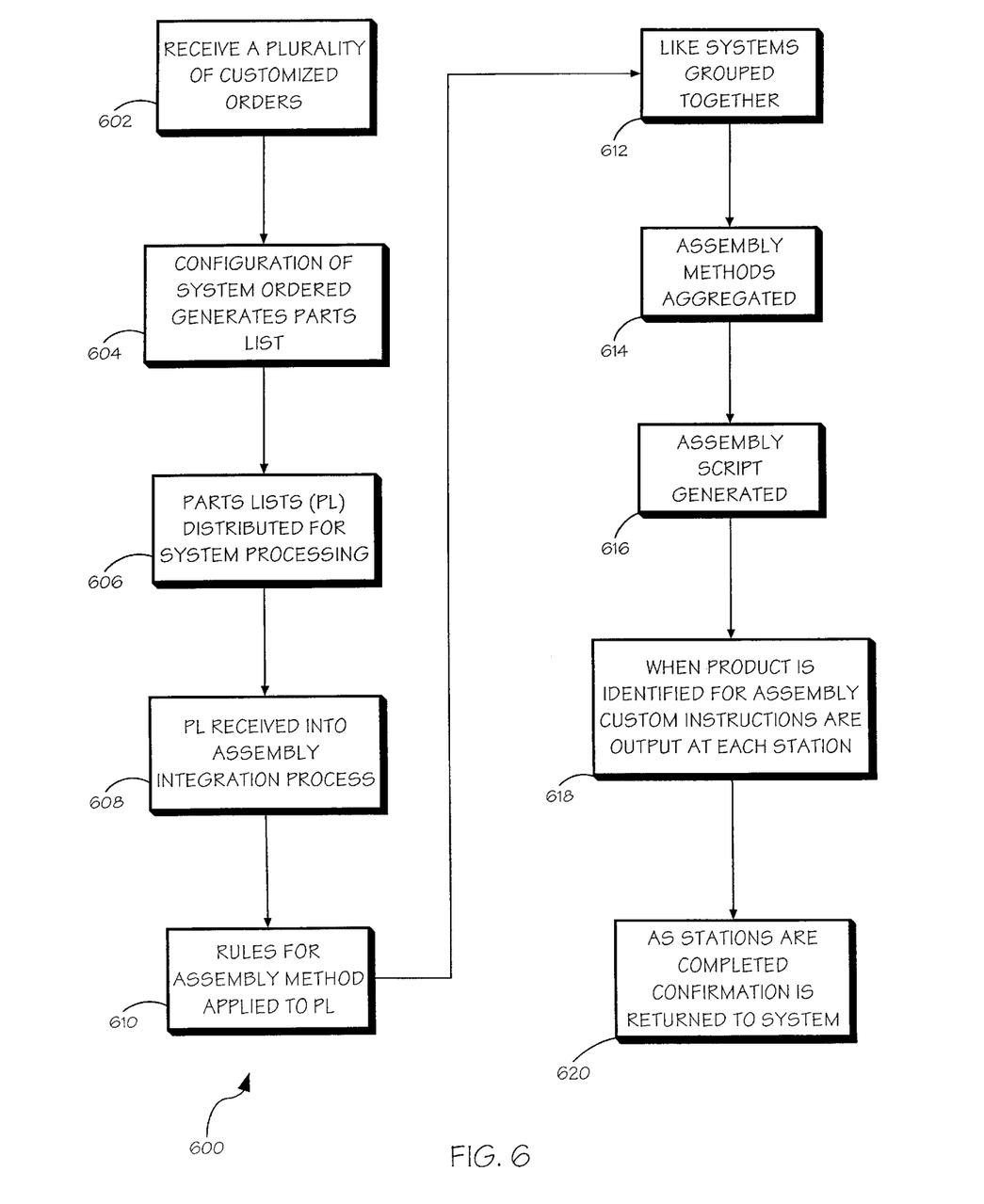
FIG. 6 is a flow diagram depicting an additional exemplary embodiment of the present invention wherein the configuration of a plurality of ordered systems is grouped by an assembly method to produce an assembly script based on like assembly requirements.

Referring now to FIG. 6, an additional exemplary embodiment 600 of the present invention is shown wherein an assembly integration system includes grouping like orders together for optimized assembly. Pluralities of customized orders are received by the system 602 and the configuration of the system ordered is utilized to generate a parts list 604. The parts list is then distributed for system processing 606 and received into an assembly integration process 608. The rules for the assembly method are applied to the parts list 610 including grouping like systems requiring like assembly processes together 612. Thus, like systems involving like assembly methods are aggregated together 614 to maximize the assembly process. An assembly script is generated 616 applying the rules for the assembly method and the aggregated like system. Thus, when a product is identified for assembly, custom instructions are utilized in the assembly of the product at each assembly station 618 and confirmation of the completion of each task by the station is returned to the system 620.

Referring now to FIGS. 7A, 7B, 7C and 7D, exemplary embodiments of the present invention are shown wherein a plurality of users choosing from a plurality of customizable options for a product. For instance, the consumer, accessing a receiver over a network connection, as shown in FIGS. 2 and 3, may select from a plurality of options to configure a desired product, such as an information handling system. The user may utilize data entry screens, such as the examples shown in FIGS. 7A and 7B, to select from a variety of option choices to enter the data into the receiver. By offering a variety of options, the overhead of producing the product may be greatly increased.

Figure 7A:
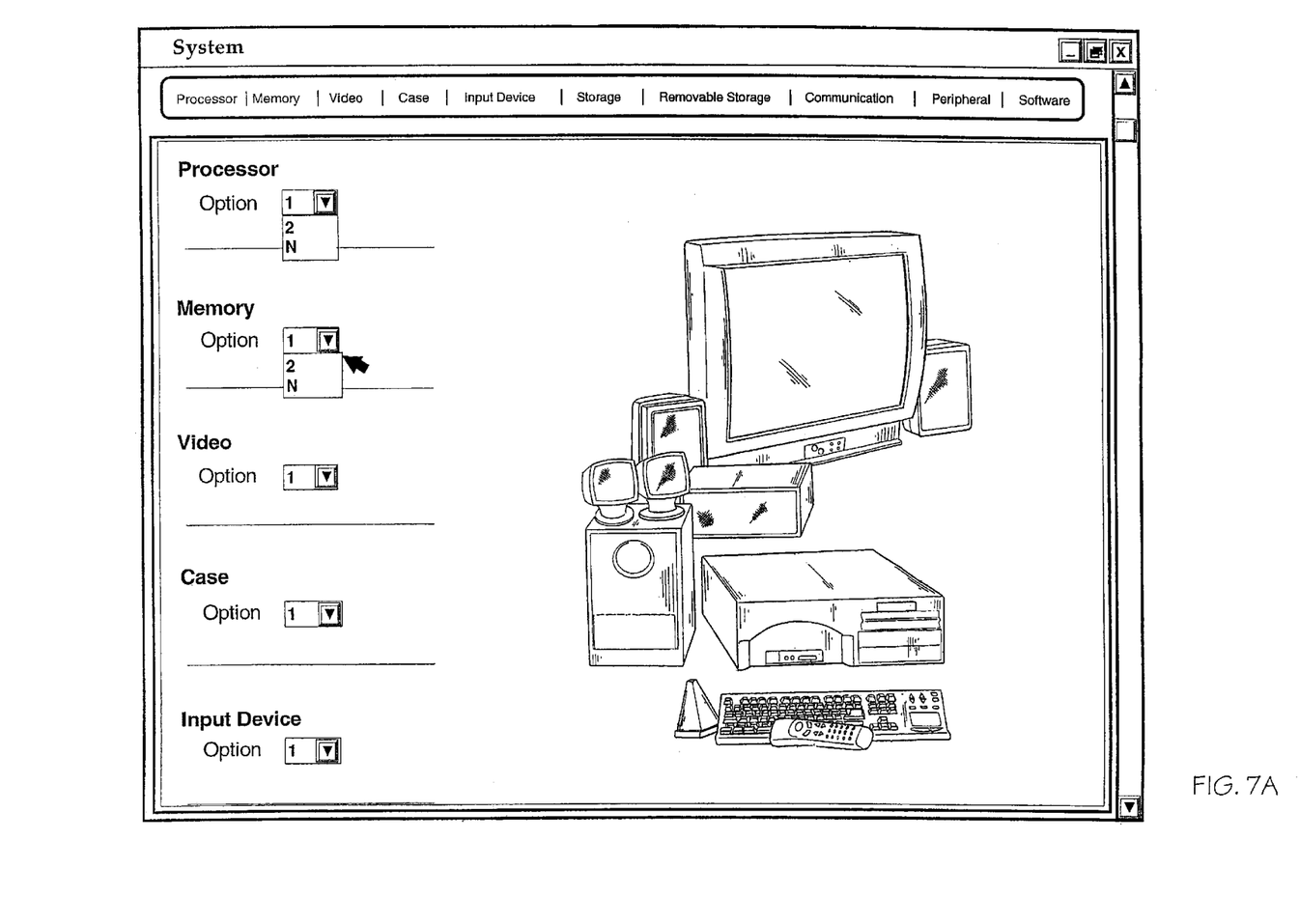
FIGS. 7A and 7B illustrate exemplary data entry screens of the present invention wherein a user may enter data on a receiver for generation of a parts list.
Figure 7B:
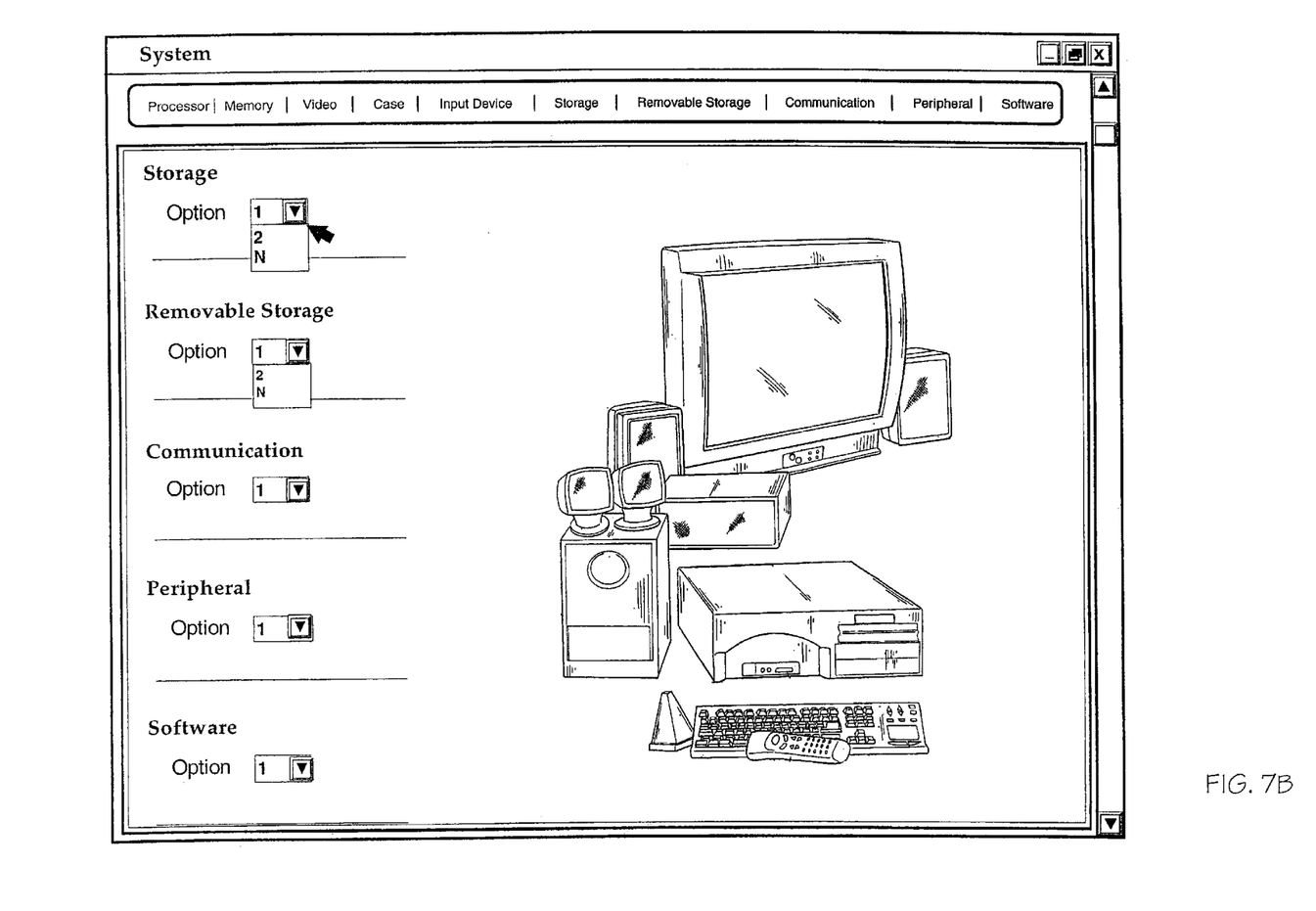
Figure 7C:
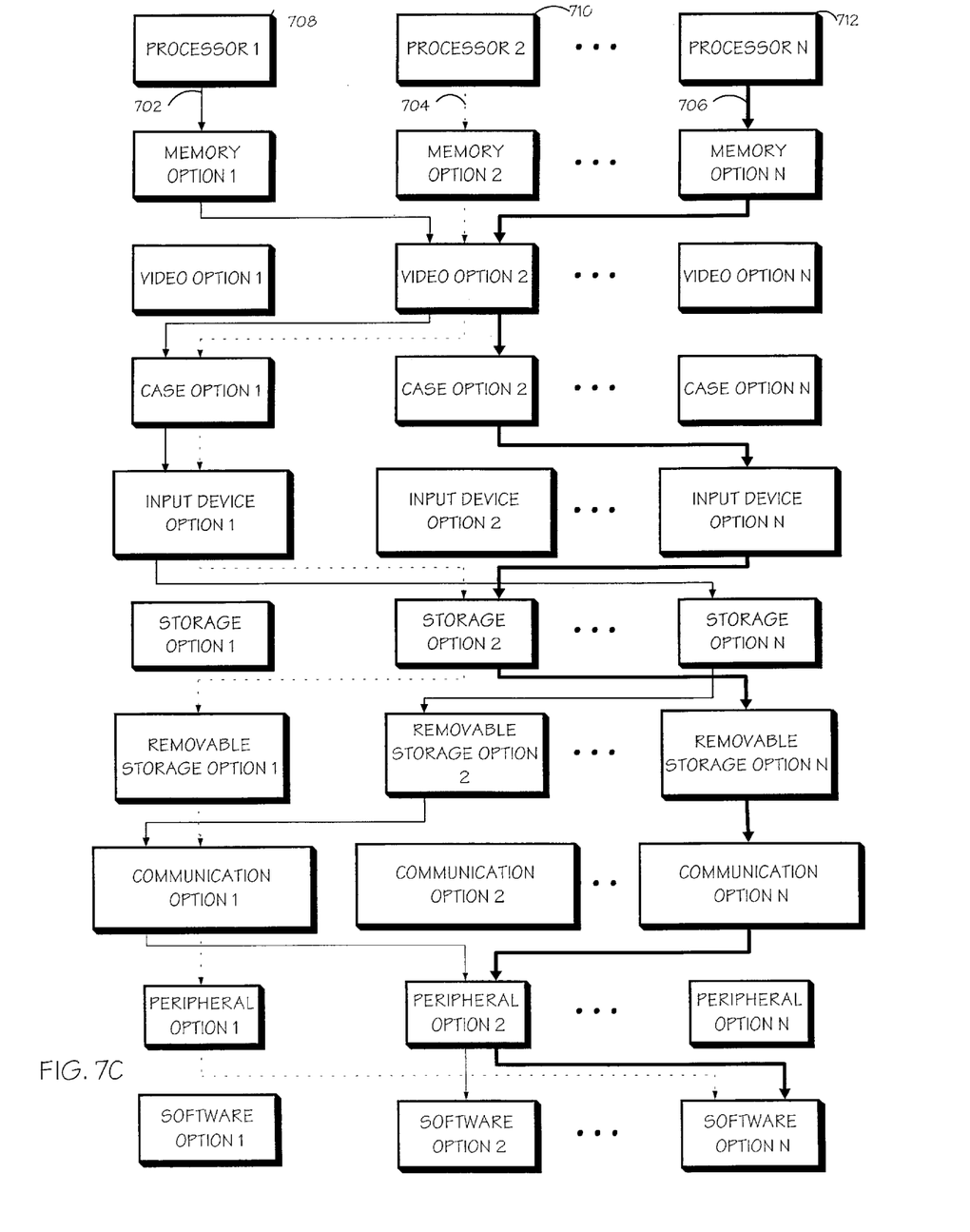
FIG. 7C is a block diagram depicting an exemplary embodiment wherein a plurality of option choices suitable for being chosen by a plurality of users.

For example, in an exemplary embodiment 700 of the present invention as shown in FIG. 7C, a first consumer as denoted by a light weight line 702, a second consumer as denoted by a dashed line 704, and a third user as denoted by a heavy weight line 706, may select from different processor options 708, 710 and 712 from a plurality of processors. Thus, as the first consumer 702 selects between memory, video, case, input device, storage, removable storage, communication, peripheral, software, and the like, these choices are input to the receiver. A second consumer 704 also choosing from the variety of choices, such as processor, memory, video, case, input device, storage, removable storage, communication, peripheral, software, and the like, inputs this information into the receiver. Similarly, the third consumer 706 also chooses from the variety of choices, such as processor, memory, video, case, input device, storage, removable storage, communication, peripheral, software, and the like also has the choices input into the receiver. As is readily apparent, providing a wide variety of choices has the necessary consequence of increased overhead and production time as these options are incorporated into the desired product. However, by grouping like system together, the production of these systems may be accomplished in an improved and efficient manner.

Figure 7D:
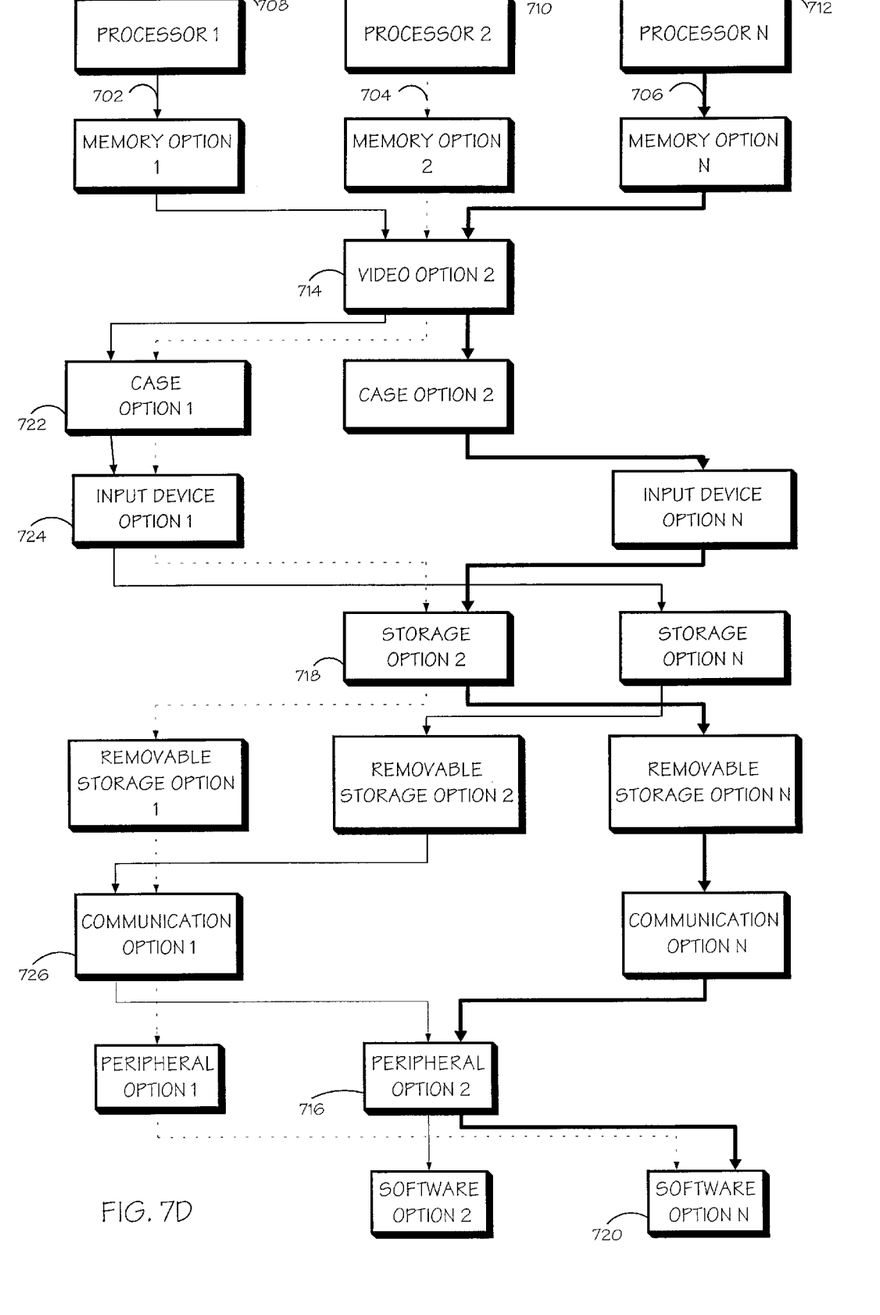
FIG. 7D is a block diagram further illustrating the exemplary embodiment as shown in FIG. 7C wherein the choices chosen by three users are shown.

Referring now to FIG. 7D, an exemplary embodiment of the present invention, as shown in FIG. 7C, is illustrated wherein consumer selections from a variety of options are shown. A plurality of consumers selecting from a variety of options may select similar options. For example, a first consumer 702 may select certain options similar to the options chosen by a third consumer 706, such as video option two 714 and peripheral option two 716. Additionally, a second consumer 704 may select options in common with the third consumer 706, such as video option two 714, storage option two 716, and software option "n" 720. Similarly, the first consumer may select options in common with the second consumer 706, such as video option two 714, case option one 722, input device option one 724, and communication option one 726. Thus, the first consumer 702 and the second consumer 704 have the most choices in common. Grouping the first consumer 702 and the second consumer 704 together may increase the efficiency of the assembly process by installing the similar parts. It may also be preferable to further extend the grouping as the similarities continue to further increase the efficiency of the process. For instance, product one chosen by consumer one may be produced first and the next most similar product, chosen by consumer two, next, followed again by the product most similar to product two, in this example chosen by consumer three. This hierarchical ordering based on similarity of options chosen may allow the products to be produced in an improved and more efficient manner.

Figure 8:
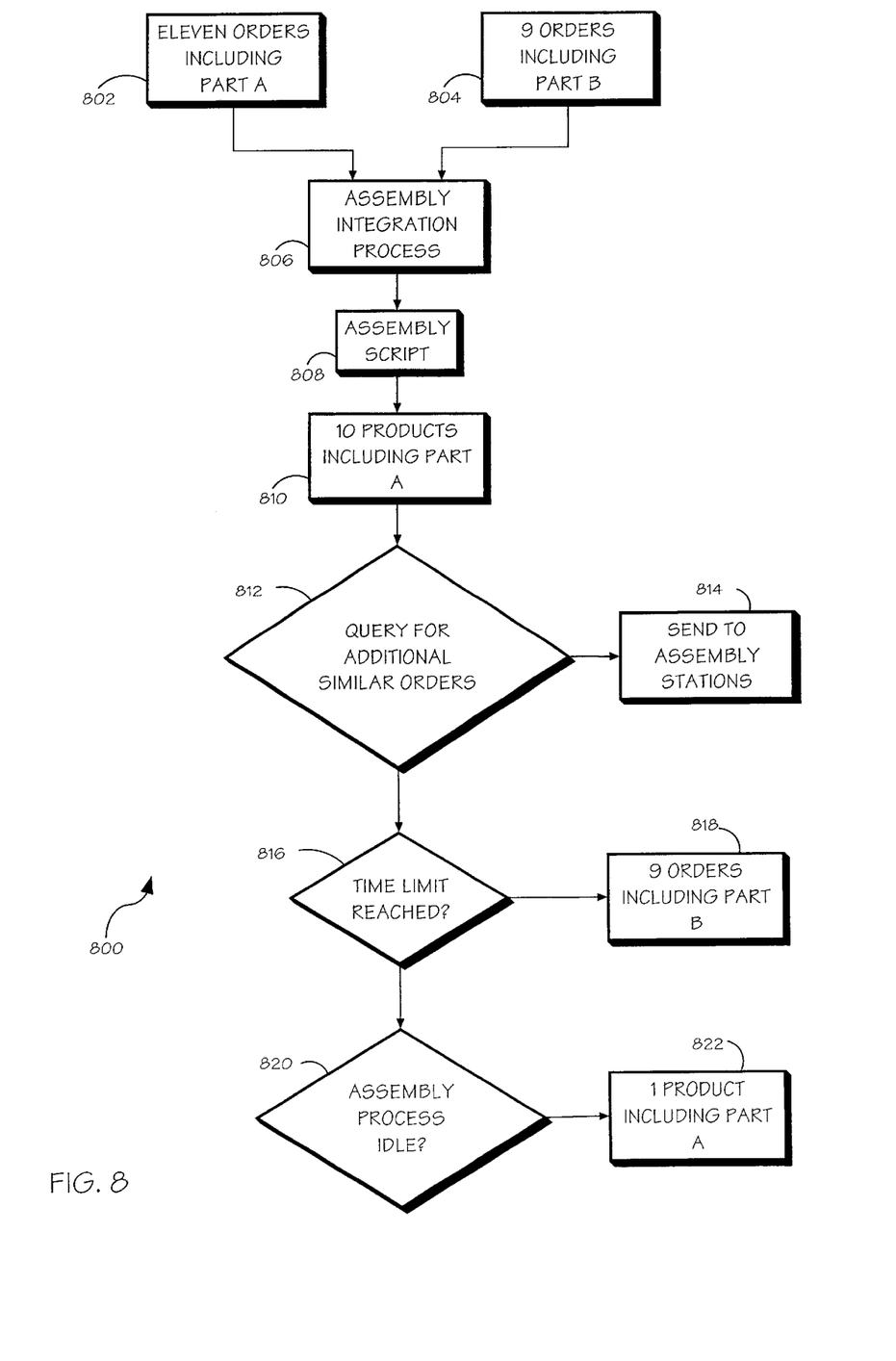
FIG. 8 is a flow diagram illustrating an additional exemplary embodiment of the present invention wherein an assembly integration process groups orders based on parts groupings, includes time limitations and queries the assembly process to further increase efficiency of the present invention.

There are a wide variety of groupings based on commonality between orders that are contemplated by the present invention without departing from the spirit and scope thereof. For example, it may be preferable to perform groupings based on units of supplied components, as shown in FIG. 8. Rules for an assembly method as applied to a parts list, as discussed in conjunction with FIGS. 4, 5 and 6, may include information related to parts quantities. Thus, it may be preferable to perform the assembly process based on groupings corresponding to the typically encountered groupings of parts so that the assembly process may be performed in an efficient manner. For example, in an exemplary embodiment 800 a system of the present invention may receive eleven orders for information handling systems including part A 802 and nine orders for information handling system including part B 804. These orders may be forwarded to an assembly integration process 806 wherein an assembly script is derived 808. In this instance, part A and part B are typically purchased and/or transported in groups of ten, such as ten parts to a box. Thus, when deriving an assembly script 808, the system will group the items based on the groupings of the parts, so that when the ten orders are received for part A the assembly script for producing those orders is initiated 810 to produce those ten corresponding products. While those ten products are being produced, the system may still continue to query for additional similar orders 812 and continue to produce groupings. For example, if an additional order including part B was encountered, the preferable 10 unit grouping would be reached and that assembly script may then be sent to be performed 814.

It may also be preferable to incorporate a time limitation so that products are produced in a timely fashion, such as 24 hours and the like as contemplated by a person of ordinary skill in the art. If this time limitation is reached 816, those products may then be produced in a timely fashion 818. Additionally, it may also be preferable to insure that the system continues producing products to further maximize the efficiency of the system. Thus, if the assembly process is idle 820, any further orders waiting for production may be initiated regardless of the groupings, such as the remaining product including part A 822 that was initially received 802. Although exemplary groupings and products are described in this embodiment, it should be appreciated that a wide variety of products and groupings are contemplated by the present invention without departing from the spirit and scope thereof. For example, it may be preferable to group products based on similar production requirements, regardless of the parts necessary in the performance of the process.

It is believed that the system and method for assembly integration of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method of assembling a product based on a received order, comprising:
   receiving an order for a product having a desired configuration, the order being received over a network;
   generating a parts list corresponding to the desired configuration;
   applying an assembly method to the parts list to derive an assembly script; and
   transferring the assembly script to a plurality of assembly stations, wherein the assembly script provides a custom instruction to the assembly stations so that the product corresponding to the order may be produced having the desired configuration and wherein the order is at least one of input by a representative in response to a received call and input by a user over an Internet connection.

2. The method as described in claim 1, wherein a plurality of orders are received, a collection of like orders are grouped together.

3. The method as described in claim 2, wherein said collection of like orders are grouped together by at least one of the following:
   generating a parts list wherein products with corresponding parts are grouped together; and
   applying an assembly method wherein products requiring corresponding assembly processes are grouped together.

4. The method as described in claim 3, wherein the assembly method is suitable for arriving at the assembly script which includes a time limitation.

5. The method as described in claim 3, wherein the assembly script is transferred to the assembly stations so as to reduce idle time of the assembly stations.

6. The method as described in claim 1, further comprising confirming performance of the custom instruction.

7. A system for assembling a product based on a received order, comprising:
   a receiver for receiving an order coupled to a network, the receiver suitable for receiving an order for a product having a desired configuration, the order being received over the network;
   a parts lists generator coupled to the receiver; the parts list generator suitable for generating a parts list corresponding to the desired configuration;
   an assembly integration process coupled to the parts list generator, the assembly integration process suitable for applying an assembly method to the parts list to derive an assembly script; and
   a plurality of assembly stations coupled to the assembly integration process, the plurality of assembly stations suitable for producing a product utilizing the assembly script, wherein the assembly script provides a custom instruction to the assembly stations so that the product corresponding to the order may be produced having the desired configuration and wherein the order is at least one of input by a representative in response to a received call and input by a user over an Internet connection.

8. The system as described in claim 7, wherein a plurality of orders are received by the receiver, a collection of like orders are grouped together.

9. The system as described in claim 7, wherein said collection of like orders are grouped together by at least one of the following:
   the parts list generator generates the parts list wherein products with corresponding parts are grouped together; and
   the assembly integration process applies the assembly method wherein products requiring corresponding assembly processes are grouped together.

10. The system as described in claim 9, wherein the assembly integration process is suitable for arriving at the assembly script which includes a time limitation.

11. The system as described in claim 9, wherein the assembly script is transferred to the assembly stations so as to reduce idle time of the assembly stations.

12. The system as described in claim 7, further comprising confirming performance of the custom instruction.

13. A system for assembling a product based on a received order, the system comprising:
- a processor for executing a program of instructions on the system; and
- a memory coupled to the processor, the memory suitable for storing the program of instructions executable by said processor; wherein the program of instructions configures the system to
  - receive an order for a product having a desired configuration, the order being received over a network;
  - generate a parts list corresponding to the desired configuration;
  - apply an assembly method to the parts list to derive an assembly script; and
  - transfer the assembly script to a plurality of assembly stations, wherein the assembly script provides a custom instruction to the assembly stations so that the product corresponding to the order may be produced having the desired configuration and wherein the order is at least one of input by a representative in response to a received call and input by a user over an Internet connection.

14. The system as described in claim 13, wherein a plurality of orders are received, a collection of like orders are grouped together.

15. The system as described in claim 14, wherein said collection of like orders are grouped together by at least one of the following:
- generating a parts list wherein products with corresponding parts are grouped together; and
- applying an assembly system wherein products requiring corresponding assembly process are grouped together.

16. The system as described in claim 15, wherein the assembly system is suitable for arriving at the assembly script which includes a time limitation.

17. The system as described in claim 15, wherein the assembly script is transferred to the assembly stations so as to reduce idle time of the assembly stations.

18. The system as described in claim 13, further comprising confirming performance of the custom instruction.

* * * * *